(12) United States Patent
Funk et al.

(10) Patent No.: US 8,332,841 B2
(45) Date of Patent: Dec. 11, 2012

(54) SYSTEM AND METHOD FOR CREATING PLATFORM-SPECIFIC SELF-EXTRACTING CLIENT PACKAGES USING A PRODUCTION SERVER

(75) Inventors: Randall Brett Funk, Alpine, UT (US); Joseph Hyrum Astin, Riverton, UT (US)

(73) Assignee: Novell Intellectual Property Holdings, Inc., Seattle, WA (US)

( * ) Notice: Subject to any disclaimer, the term of this patent is extended or adjusted under 35 U.S.C. 154(b) by 1088 days.

(21) Appl. No.: 11/954,797

(22) Filed: Dec. 12, 2007

(65) Prior Publication Data

US 2009/0158270 A1 Jun. 18, 2009

(51) Int. Cl.
*G06F 9/445* (2006.01)
(52) U.S. Cl. ......... 717/174; 717/175; 717/170; 717/177
(58) Field of Classification Search ........... 717/168–178
See application file for complete search history.

(56) References Cited

U.S. PATENT DOCUMENTS 7,379,982 B2 * 5/2008 Tabbara ................. 709/220
2006/0277542 A1 12/2006 Wipfel
2009/0119660 A1 * 5/2009 Redpath ................. 717/175

* cited by examiner

*Primary Examiner* — Don Wong
*Assistant Examiner* — Deric Ortiz
(74) *Attorney, Agent, or Firm* — Marger Johnson & McCollom PC

(57) ABSTRACT

System and method for creating platform-specific self-extracting client packages using a production server are described. In one embodiment, the method comprises compiling a source file on a first build server comprising a first computing platform to produce a first executable seed file for the first computing platform and compiling the source file on a second build server comprising a second computing platform to produce a second executable seed file for the second computing platform; and providing the first and second executable seed files to a production server comprising the first computing platform. The production server uses the first executable seed file to create a first client package and a second client package, wherein the first client package is designed to be installed and execute on a first workstation running on the first computing platform and the second client package is designed to be installed and execute on a second workstation running on the second computing platform.

20 Claims, 2 Drawing Sheets

SYSTEM AND METHOD FOR CREATING PLATFORM-SPECIFIC SELF-EXTRACTING CLIENT PACKAGES USING A PRODUCTION SERVER

BACKGROUND

Currently, installation of a loosely-defined (i.e., modifiable by either the administrative users of the service or required by an update to the service) set of platform-specific content in connection with a service that runs on a specified set of platforms can be performed in a variety of ways. For example, a cross-platform installer, such as InstallAnywhere or InstallShield, may be bundled with the service and made available at runtime for creating an installer for each target platform. This method is problematic, however, due to the difficulty and expense of licensing the installer for shipment, as well as in the size of the resulting packages for each target architecture. Additionally, this method makes it difficult to subsequently add additional supported platforms.

Alternatively, platform-specific tools (such as WinZip for Windows, or tar/gzip for Linux) could be used for each supported platform. A disadvantage to this method is that the tools for creating each package must be shipped on each server type. This quickly becomes unwieldy as more supported platforms are added. Additionally, because the packages are not necessarily self-extracting, they may require external software on the target device(s) to facilitate their use. Similarly, in the case of MicroSoft Installer ("MSI") or Red Hat Package Manager ("RPM") packages, the requirement for creating the non-native package type at runtime on the server still requires the developer to ship tools for doing so on every supported platform.

SUMMARY

One embodiment is a method for creating platform-specific self-extracting client packages using a production server. The method comprises compiling a source file on a first build server comprising a first computing platform to produce a first executable seed file for the first computing platform and compiling the source file on a second build server comprising a second computing platform to produce a second executable seed file for the second computing platform; and providing the first and second executable seed files to a production server comprising the first computing platform. The production server uses the first executable seed file to create a first client package and a second client package, wherein the first client package is designed to be installed and execute on a first workstation running on the first computing platform and the second client package is designed to be installed and execute on a second workstation running on the second computing platform.

DETAILED DESCRIPTION

This disclosure relates generally to self-extracting client software packages and, more specifically, to a system and method for enabling such packages to be built for and installed on a predetermined set of computing platforms "on-the-fly" without further need for compilers or development environments.

Figure 1:
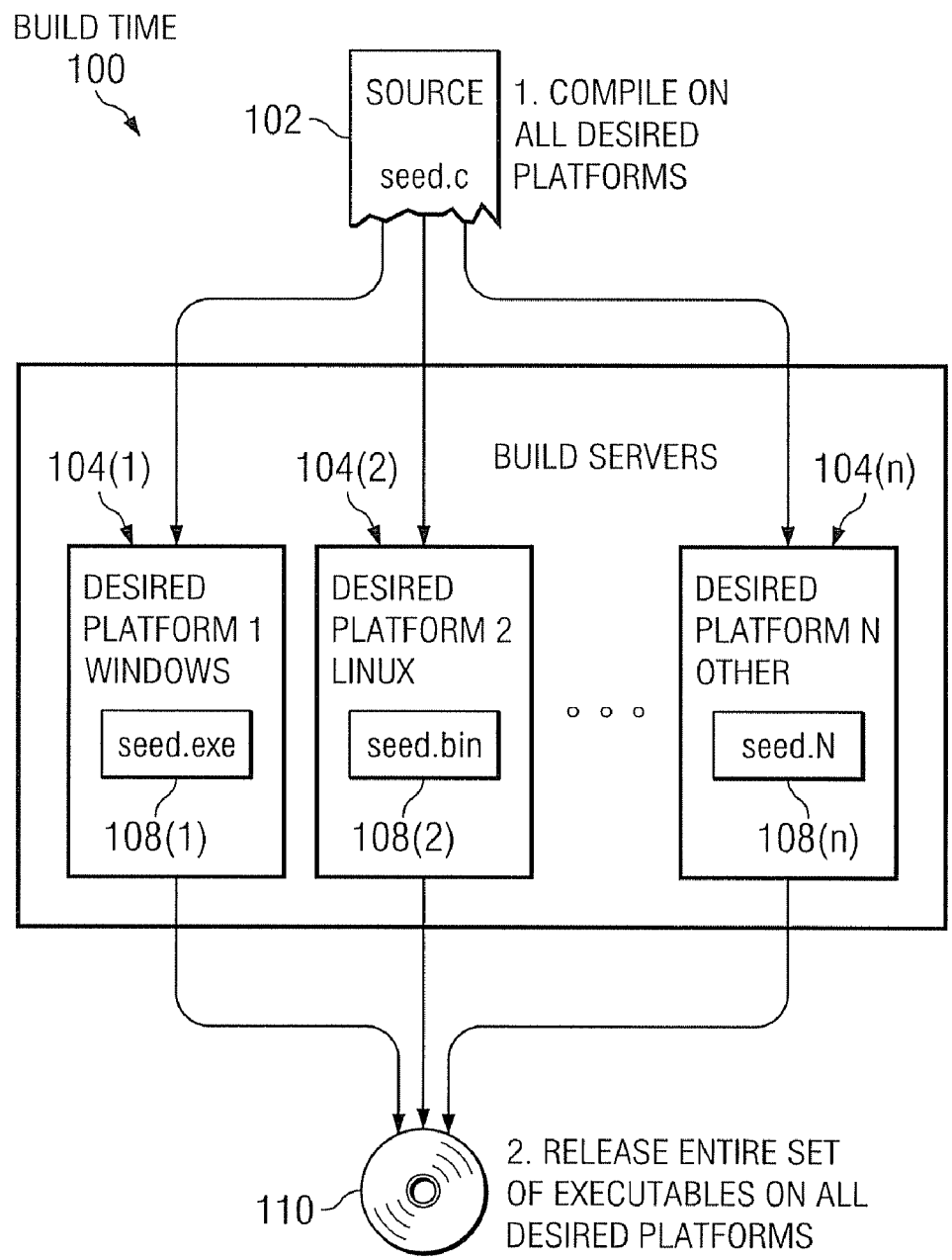
FIG. 1 illustrates an embodiment of a system for implementing a build-time portion of a method for creating platform-specific self-extracting client packages using a production server.

FIG. 1 illustrates a system 100 for implementing a build-time portion of a method for creating platform-specific self-extracting client packages using a production server. In the embodiment illustrated in FIG. 1, the system 100 includes a source file 102 designated "seed.c." The source file 102 is compiled on one or more build servers 104(1)-104(n), each of which comprises a different computing platform. It will be assumed for the sake of example that the computing platform of the build server 104(1) is Windows, the computing platform of the build server 104(2) is Linux, and the computing platform of the build server 104(n) is some other supported computing platform N. It will be recognized that fewer or more than three build servers may be included and computing platforms supported.

Continuing with the above-noted example, the source file 102 is compiled on the Windows server 104(1) to produce a Windows executable seed file 108(1) designated "seed.exe." Similarly, the source file 102 is compiled on the Linux server 104(2) to produce a Linux executable seed file 108(2) designated "seed.bin," and on the server N 104(n) to produce an N platform executable seed file 108(n), designated "seed.N." The executable seed files 108(1), 108(2), and 108(n) are combined into a set of executables 110. It will be recognized that distribution of the set of executables 110 may be accomplished via distribution of storage media, such as a CD, on which the set of executables 110 is stored or by some other means, such as via a network or other connection.

Figure 2:
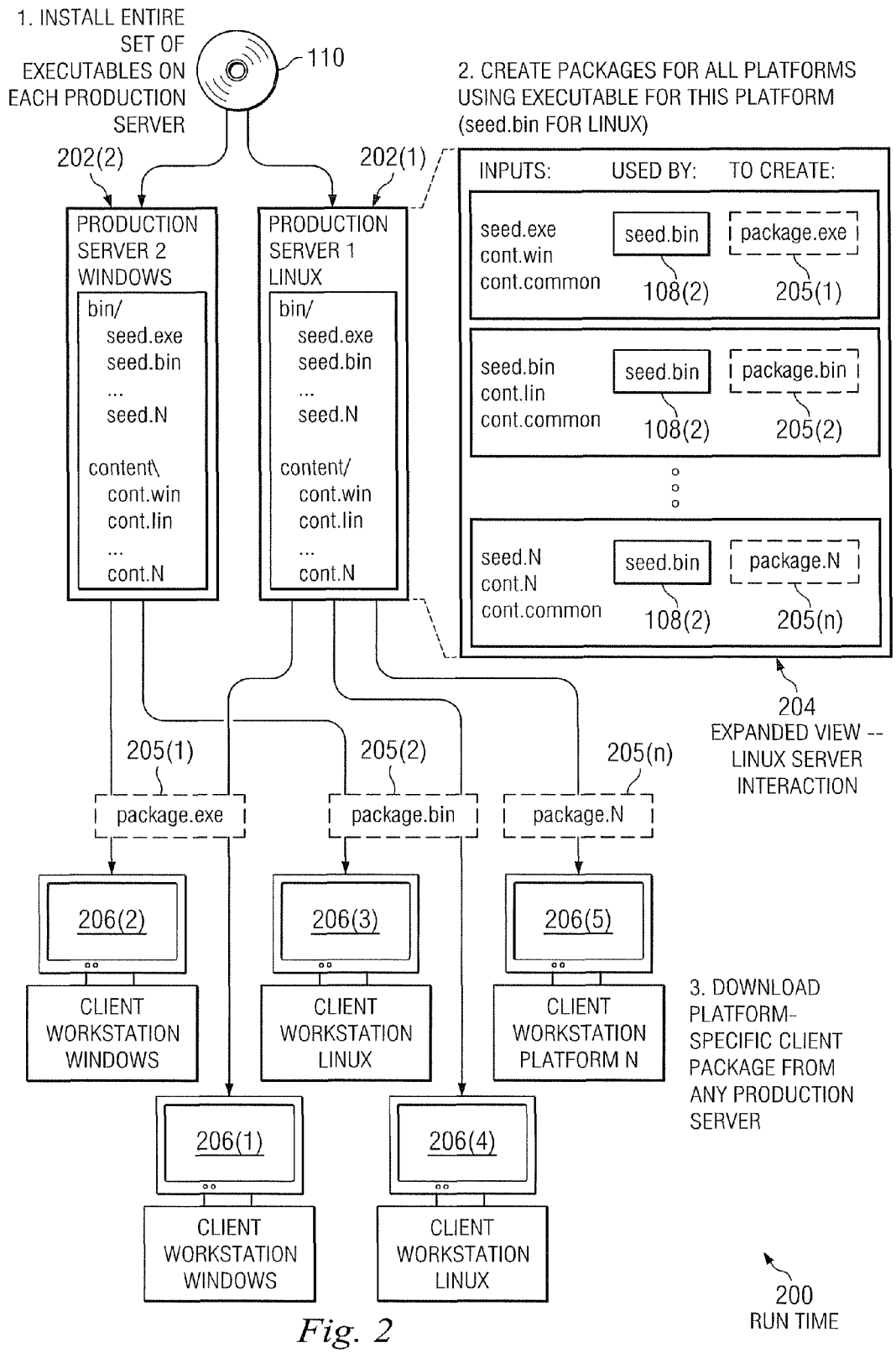
FIG. 2 illustrates an embodiment of a system for implementing a run-time portion of the method for creating platform-specific self-extracting client packages using a production server.

FIG. 2 illustrates a system 200 for implementing a run-time portion of the method for creating platform-specific self-extracting client packages using a production server. As shown in FIG. 2, the set of executables 110 created using the system 100 (FIG. 1) is installed on each of a plurality of production servers, represented in FIG. 2 by two production servers 202(1), 202(2), although it will be recognized that fewer or more than two production servers may be implemented in the system 200. Each of the production servers 202(1), 202(2) runs on a different computing platform and may have stored thereon a variety of files comprising platform-specific content and common content. It will be assumed for the sake of example that production server 202(1) is a Linux server and production server 202(2) is a Windows server.

Regardless of the computing platform supported by the production server, each of the servers 202(1), 202(2), creates packages for all of the supported computing platforms (e.g., Windows, Linux, and N) using the executable for its supported computing platform. For example, the executable seed.bin is used by the Linux server 202(1) to create platform-specific client packages for each of the supported computing platforms Windows, Linux, and N. In particular, as illustrated in an expanded view of operation 204, the Linux server 202(1) uses its executable seed file 108(2) (seed.bin) to create a platform-specific client package 205(1) designated "package.exe," for Windows clients, represented in FIG. 2 by workstations 206(1), 206(2), from input files including seed.exe, Windows-specific content files ("cont.win"), and common content files ("cont.common"). Similarly, the Linux server 202(1) uses its executable seed file 108(2) (seed.bin) to create a platform-specific client package 205(2) designated "package.bin," which is a platform-specific client package for Linux clients, represented in FIG. 2 by workstations 206(3), 206(4), from input files including seed.bin, Linux-specific content files ("cont.lin"), and common content files ("cont- .common"). Finally, the Linux server 202(1) uses its executable seed file 108(2) (seed.bin) to create platform-specific client package 205(n) designated "package.N," which is platform-specific client package for N computing platform clients, represented in FIG. 2 by a workstation 206(5), from input files including seed.N, N platform-specific content files ("cont.N"), and common content files ("cont.common").

It will be recognized that the Windows server 202(2) employs a similar process using seed.exe to create packages for each of the workstations 206(1)-206(5). Although not shown in FIG. 2, it will also be recognized that an N computing platform production server would employ a similar process using seed.N to create packages for each of the workstations 206(1)-206(5).

It will be recognized that, although in the embodiments illustrated in FIGS. 1 and 2, both common and platform-specific content are included in each of the client packages, other content may be included instead of or in addition to such common and platform-specific content. In other words, the package contents are not static, but may be changed at any time as desired. In this manner, the packages are created "on-the-fly," with the necessary content being incorporated into each package as required at the time the package is created.

It is understood that modifications, changes and substitutions are intended in the foregoing disclosure and in some instances some features of the embodiments will be employed without a corresponding use of other features. Accordingly, it is appropriate that the appended claims be construed broadly and in a manner consistent with the scope of the embodiments described herein.

Although the present disclosure has described embodiments relating to specific networking environments, it is understood that the apparatus, systems and methods described herein could applied to other environments. While the preceding description shows and describes one or more embodiments, it will be understood by those skilled in the art that various changes in form and detail may be made therein without departing from the spirit and scope of the present disclosure. For example, various steps of the described methods may be executed in a different order or executed sequentially, combined, further divided, replaced with alternate steps, or removed entirely. In addition, various functions illustrated in the methods or described elsewhere in the disclosure may be combined to provide additional and/or alternate functions. Moreover, slightly different source files (seed.c) may be used for each supported platform to handle platform-specific issues, for example. Therefore, the claims should be interpreted in a broad manner, consistent with the present disclosure.

What is claimed is:

1. A method for creating platform-specific self-extracting client packages using a production server, the method comprising:
    compiling a source file on a first build server comprising a first computing platform to produce a first executable seed file for the first computing platform and compiling the source file on a second build server comprising a second computing platform to produce a second executable seed file for the second computing platform;
    providing the first and second executable seed files to a production server comprising the first computing platform; and
    the production server using the first executable seed file to create a first client package and a second client package;
    wherein the first client package is platform-specific to only the first computing platform and is designed to be installed and execute on a first workstation running on the first computing platform and the second client package is platform-specific to only the second computing platform and is designed to be installed and execute on a second workstation running on the second computing platform.

2. The method of claim 1 further comprising:
    providing the first and second executable seed files to a second production server comprising the second computing platform; and
    the second production server using the second executable seed file to create the first client package and the second client package.

3. The method of claim 1 wherein one of the first and second computing platforms comprises a Windows computing platform.

4. The method of claim 1 wherein one of the first and second computing platforms comprises a Linux computing platform.

5. The method of claim 1 wherein one of the first and second computing platforms comprises a computing platform other than Windows and Linux.

6. The method of claim 1 further comprising:
    downloading the first client package from the production server to the first workstation without downloading the second client package; and
    downloading the second client package from the production server to the second workstation without downloading the first client package.

7. The method of claim 1 wherein the production server using the first executable seed file to create first and second client packages further comprises:
    the production server using the first executable seed file to create the first client package from input files comprising the first executable seed file and at least one file comprising content for the first client package; and
    the production server using the first executable seed file to create the second client package from input files comprising the second executable seed file and at least one file comprising content for the second client package.

8. The method of claim 7 wherein the at least one file comprising content for the first client package comprises a file selected from the group consisting of common content files and files specific to the first computing platform and wherein the at least one file comprising content for the second client package comprises a file selected from the group consisting of common content files and files specific to the second computing platform.

9. A system for creating platform-specific self-extracting client packages using a production server, the system comprising:
    a first build server comprising a first computing platform, the first build server for compiling a source file to produce a first executable seed file for the first computing platform;
    a second build server comprising a second computing platform, the second build server for compiling the source file to produce a second executable seed file for the second computing platform;
    a production server comprising the first computing platform, the production server for receiving the first and second executable seed files from the first and second build servers, respectively, and for creating a first client package and a second client package using the first executable seed file;
    wherein the first client package is platform-specific to only the first computing platform and is designed to be installed and execute on a workstation running on the first computing platform and the second client package is platform-specific to only the second computing platform and is designed to be installed and execute on a workstation running on the second computing platform.

10. The system of claim 9 further comprising:
a second production server comprising the second computing platform, the second production server for receiving the first and second executable seed files from the first and second build servers, respectively, and for creating the first and second client packages using the second executable seed file.

11. The system of claim 9 wherein one of the first and second computing platforms comprises a Windows computing platform.

12. The system of claim 9 wherein one of the first and second computing platforms comprises a Linux computing platform.

13. The system of claim 9 wherein one of the first and second computing platforms comprises a computing platform other than Windows and Linux.

14. The system of claim 9 further comprising:
a first workstation for receiving the first client package from the production server; and
a second workstation for receiving the second client package from the production server.

15. The system of claim 9 wherein the production server uses the first executable seed file to create the first client package from input files comprising the first executable seed file and at least one file comprising content for the first client package and uses the first executable seed file to create the second client package from input files comprising the second executable seed file and at least one file comprising content for the second client package.

16. The system of claim 15 wherein the at least one file comprising content for the first client package comprises a file selected from the group consisting of common content files and files specific to the first computing platform and wherein the at least one file comprising content for the second client package comprises a file selected from the group consisting of common content files and files specific to the second computing platform.

17. A method for creating platform-specific self-extracting client packages using a production server, the method comprising:
providing to a production server comprising a first computing platform a first executable seed file specific to the first computing platform, wherein the first executable seed file is created by compiling a source file on a first build server comprising the first computing platform, and a second executable seed file specific to a second computing platform, wherein the second executable seed file is created by compiling the source file on a second build server comprising the second computing platform;
the production server using the first executable seed file to create a first client package and a second client package;
downloading the first client package to a first workstation running on the first computing platform without downloading the second client package; and
downloading the second client package to a second workstation running on the second computing platform without downloading the first client package,
wherein the first client package is platform-specific to only the first computing platform and is designed to be installed and execute on a workstation running on the first computing platform and the second client package is platform-specific to only the second computing platform and is designed to be installed and execute on a workstation running on the second computing platform.

18. The method of claim 17 further comprising:
providing the first and second executable seed files to a second production server comprising the second computing platform; and
the second production server using the second executable seed file to create the first client package and the second client package.

19. The method of claim 17 wherein the production server using the first executable seed file to create first and second client packages further comprises:
the production server using the first executable seed file to create the first client package from input files comprising the first executable seed file and at least one file comprising content for the first client package; and
the production server using the first executable seed file to create the second client package from input files comprising the second executable seed file and at least one file comprising content for the second client package.

20. The method of claim 19 wherein the at least one file comprising content for the first client package comprises a file selected from the group consisting of common content files and files specific to the first computing platform and wherein the at least one file comprising content for the second client package comprises a file selected from the group consisting of common content files and files specific to the second computing platform.

* * * * *

UNITED STATES PATENT AND TRADEMARK OFFICE
CERTIFICATE OF CORRECTION

| | | |
|---|---|---|
| PATENT NO. | : 8,332,841 B2 | Page 1 of 1 |
| APPLICATION NO. | : 11/954797 | |
| DATED | : December 11, 2012 | |
| INVENTOR(S) | : Funk et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1151 days.

Signed and Sealed this
Fourteenth Day of October, 2014

Michelle K. Lee
*Deputy Director of the United States Patent and Trademark Office*